(12) United States Patent
Black et al.

(10) Patent No.: US 8,317,537 B1
(45) Date of Patent: Nov. 27, 2012

(54) UTILITY RECEPTACLE APPARATUS FOR USE WITH A WORK SURFACE OR SIMILAR ARTICLE

(75) Inventors: David Black, Orange, CT (US); Robert A. Love, Bloomfield, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 83 days.

(21) Appl. No.: 13/019,958

(22) Filed: Feb. 2, 2011

Related U.S. Application Data

(63) Continuation-in-part of application No. 12/633,736, filed on Dec. 8, 2009, now Pat. No. 7,901,224.

(60) Provisional application No. 61/354,236, filed on Jun. 13, 2010.

(51) Int. Cl.
*H01R 13/73* (2006.01)

(52) U.S. Cl. .......................... 439/538; 439/142

(58) Field of Classification Search .......... 439/142, 439/144, 206, 535, 538, 564; 174/66, 67
See application file for complete search history.

(56) References Cited

U.S. PATENT DOCUMENTS

| | | | | |
|---|---|---|---|---|
| 4,654,756 A | * | 3/1987 | Wilson et al. | 361/827 |
| 5,230,552 A | * | 7/1993 | Schipper et al. | 312/223.6 |
| 5,231,562 A | * | 7/1993 | Pierce et al. | 361/832 |
| 5,575,668 A | * | 11/1996 | Timmerman | 439/131 |
| 5,709,156 A | * | 1/1998 | Gevaert et al. | 108/50.02 |
| 6,397,762 B1 | * | 6/2002 | Goldberg et al. | 108/50.02 |
| 6,802,577 B2 | * | 10/2004 | Gershfeld | 312/223.3 |
| 6,881,080 B2 | * | 4/2005 | Macaluso | 439/142 |
| 7,407,392 B2 | * | 8/2008 | Cooke et al. | 439/131 |

* cited by examiner

*Primary Examiner* — Khiem Nguyen
(74) *Attorney, Agent, or Firm* — Raymond A. Nuzzo

(57) ABSTRACT

A utility receptacle apparatus for use with an article of furniture having a work surface and an opening in the work surface. The utility receptacle apparatus has a grommet member having a top side, a bottom side, a peripheral portion and an opening. The bottom side comprises a structure that is sized to fit into an opening in the work surface. The peripheral portion is sized so as to contact the work surface when the structure is disposed within the opening in the work surface. The utility receptacle apparatus further includes a device charging system attached to the grommet member. The device charging system has a charging pad for receiving and charging a chargeable electronic device. The device charging system also has electrical conductors for connection to an electrical power source. The utility receptacle apparatus further includes a receptacle base member which has portions thereof that are configured to be attached to the underside of a work surface of the article of furniture. The receptacle base member has at least one utility receptacle that is located on the receptacle base member at a predetermined location so that the utility receptacle is accessible through the openings in the work surface and grommet member when the receptacle base member is attached to the underside of the work surface.

13 Claims, 14 Drawing Sheets

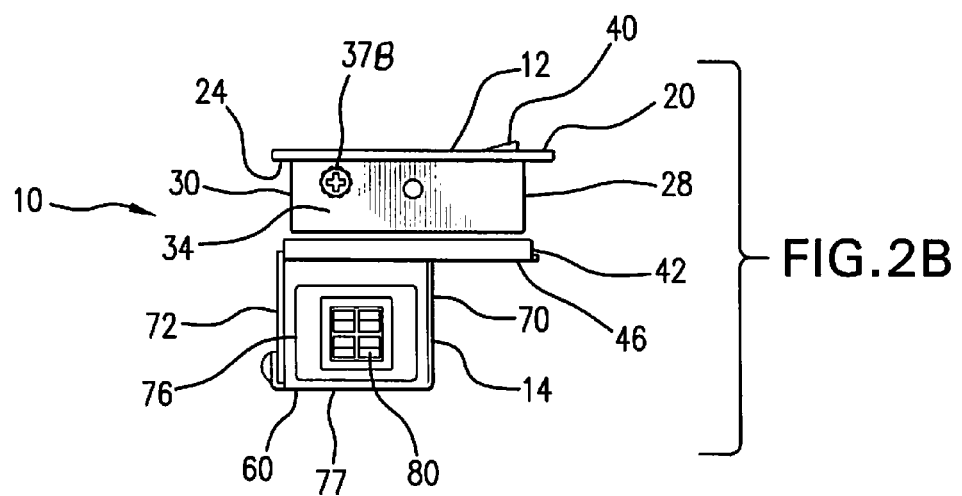
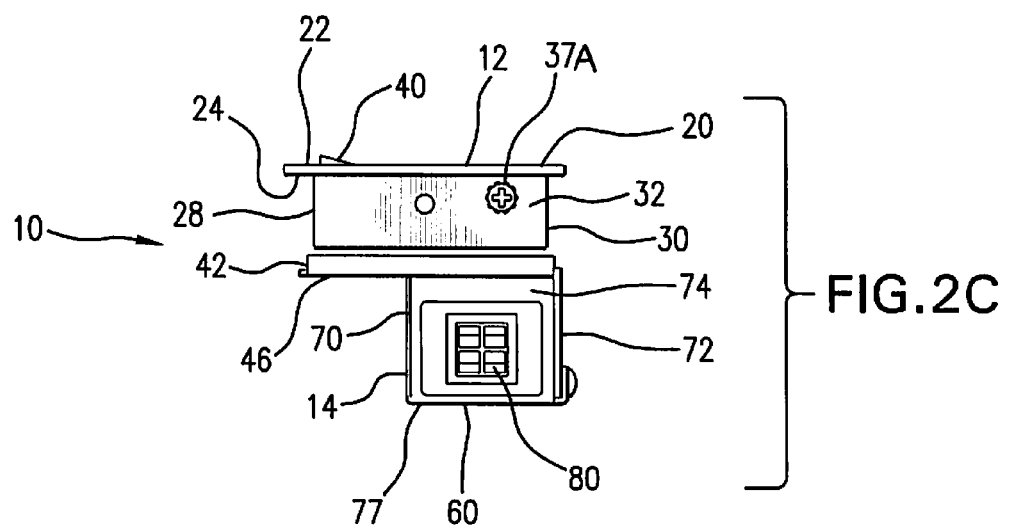

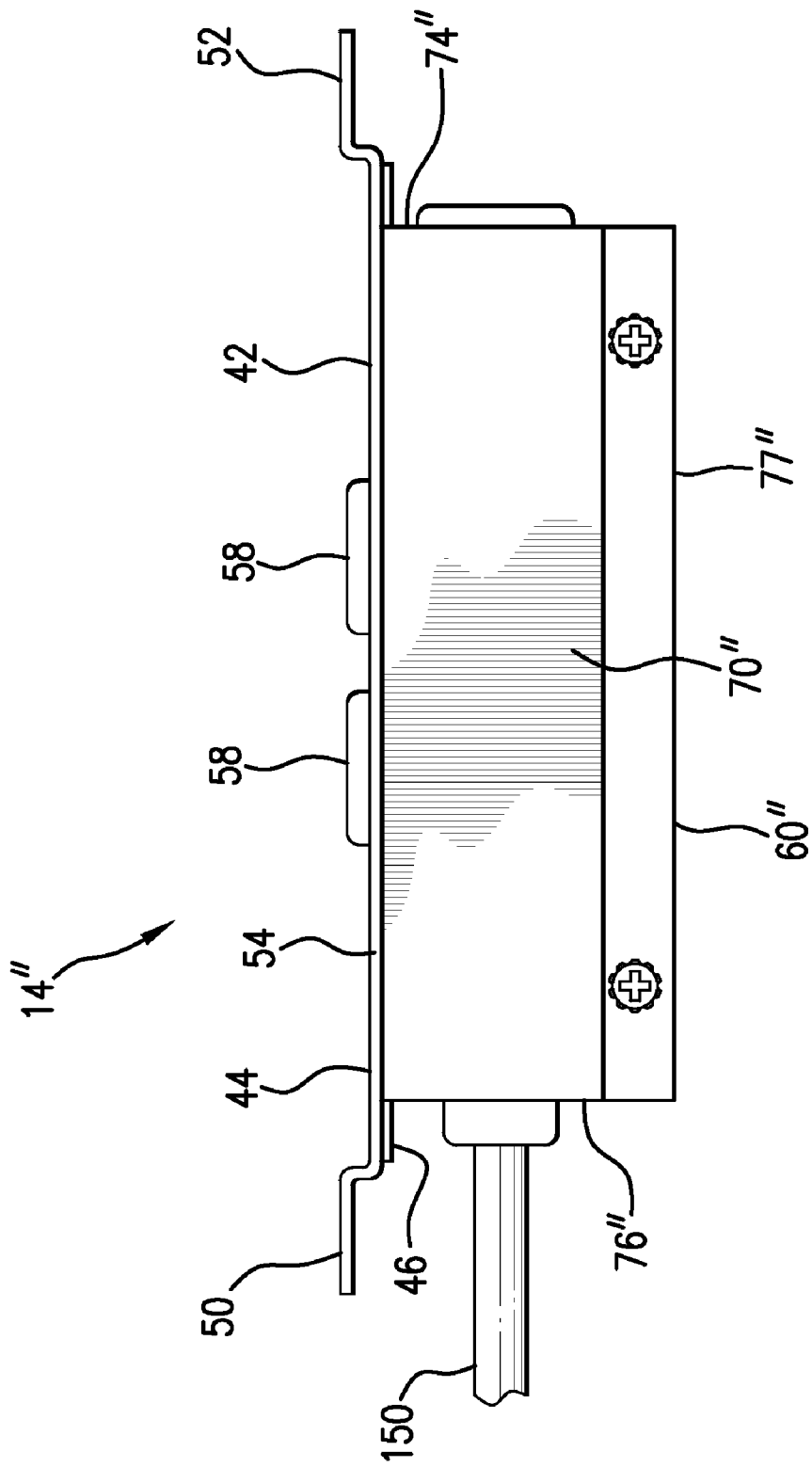

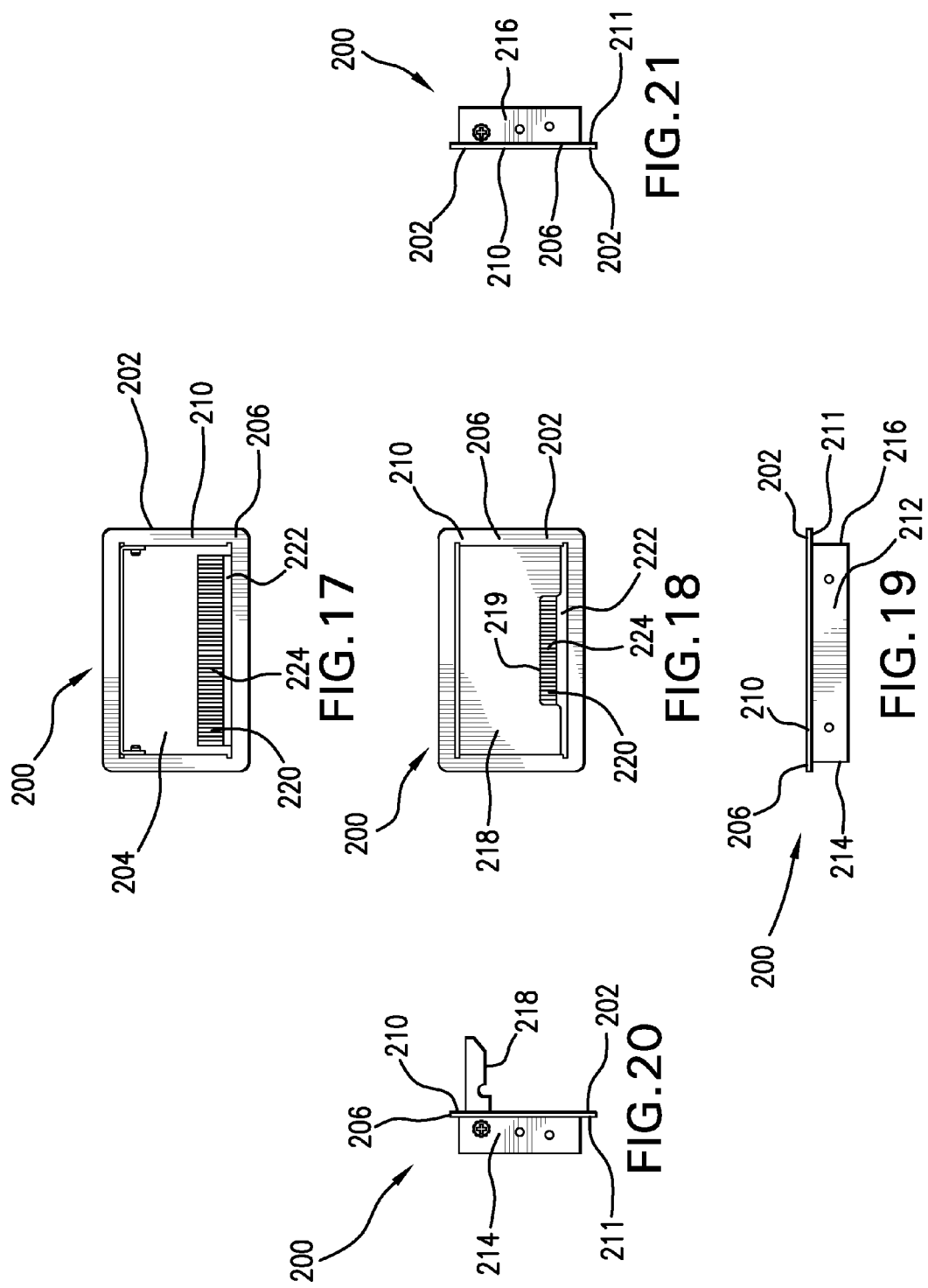

UTILITY RECEPTACLE APPARATUS FOR USE WITH A WORK SURFACE OR SIMILAR ARTICLE

CROSS-REFERENCE TO RELATED APPLICATIONS

This application is a continuation-in-part of U.S. application Ser. No. 12/633,736, filed Dec. 8, 2009 now U.S. Pat. No. 7,901,224. The entire disclosure of the aforesaid U.S. application Ser. No. 12/633,736 is hereby incorporated by reference.

This application also claims the benefit of U.S. provisional application No. 61/354,236, filed Jun. 13, 2010. The entire disclosure of the aforesaid U.S. provisional application No. 61/354,236 is hereby incorporated by reference.

TECHNICAL FIELD

The present invention generally relates to a utility receptacle apparatus that can be used with the work surface of an article of furniture such as a table, desk, workbench, workstation or similar article.

BACKGROUND ART

Power and communication outlet units that are mounted to an article of furniture, e.g. desk, table, etc. at a location below the work surface of the article of furniture are known in the art. These power and communication outlet units are typically mounted in a cut-out formed in the work surface of the article of furniture, such as a desk, workbench, table, work station, etc. such that the panel having the power and communication outlets are located below the work surface, but which are easily accessible to a user. The power and communication outlet unit typically has a lid that is used to cover the unit when not in use. The outer surface of the lid functions as a continuation of the work surface when the lid is closed. Thus, the user can actually place equipment or other items right on top of the lid when it is closed. Typical power and communication outlets for use with work surfaces of workbenches, workstations and similar articles of furniture are described in U.S. Pat. Nos. 5,709,156, 5,575,668, and 7,407,392.

DISCLOSURE OF THE INVENTION

The present invention is directed to a utility receptacle apparatus for use with a work surface. The utility receptacle apparatus comprises a grommet member and a receptacle base member. The grommet member comprises a frame structure that comprises an opening therein and an upper peripheral portion that extends about the opening. The upper peripheral portion has a top side and bottom side. The bottom side contacts the work surface of an article of furniture. The grommet member further comprises a front wall, a rear wall and sidewalls that extend downward from and are attached to the bottom side of the peripheral portion. A lid member is located within the opening and movably attached to the sidewalls. In order to mount the grommet member to an article of furniture, an opening is first formed in the article of furniture. The opening in the article of furniture has a shape that is defined by the front, rear and sidewalls of the frame structure, e.g. rectangular, square, etc. The front and rear walls and sidewalls of the frame structure are then inserted into the opening in the article of furniture. When the grommet member is completely mounted to the article of furniture, the bottom side of the upper peripheral portion contacts the work surface of the article of furniture.

The receptacle base member is configured to be attached to the article of furniture such that it is below the work surface but accessible through the opening formed in the work surface. The receptacle base member comprises a top plate section which has a top side and a bottom side. The top plate section comprises a pair of oppositely positioned raised sections and a recessed section that is located between the raised sections. Each raised section has at least one opening therein to receive screws or other fastener devices to allow the receptacle base member to be attached to the underside of the work surface. At least one utility receptacle is connected to the top plate section. In one embodiment, there is a plurality of utility receptacles connected to the top plate section. The receptacle base member comprises an enclosed member that is attached to the bottom side of the top plate section. The enclosed member has a front and rear walls, and left and right side walls. The enclosed member contains wires and conductors that are electrically connected to the utility receptacles. In one embodiment, a power cord is connected to the enclosed member and comprises wires that are electrically connected to the at least one utility receptacle. The power cord is connected to an external power source such as an AC receptacle. In another embodiment, electrical connectors are connected to each sidewall of the enclosed member. The electrical connectors are electrically connected to each other and to the at least one utility receptacle. Each electrical connector is configured to be connected to a source of electrical power. The receptacle base member is mounted to the underside of the work surface of the article of furniture so that the recessed section is positioned under the opening in the work surface of the article of furniture and the at least one utility receptacle is accessible through the opening in the article of furniture.

In a related aspect, the present invention is directed to a utility receptacle apparatus for use with an article of furniture having a work surface and an opening in the work surface. The utility receptacle apparatus comprises a grommet member having a top side, a bottom side, a peripheral portion and an opening. The bottom side comprises a structure that is sized to fit into an opening in the work surface. The peripheral portion is sized so as to contact the work surface when the structure is disposed within the opening in the work surface. The utility receptacle apparatus further comprises a device charging system attached to the grommet member. The device charging system comprises a charging pad for receiving and charging a chargeable electronic device. The device charging system includes electrical conductors for connection to an electrical power source. The utility receptacle apparatus further comprises a receptacle base member which has a pair of end portions that are configured to be attached to the underside of a work surface of the article of furniture. The receptacle base member comprises at least one utility receptacle that is located on the receptacle base member at a predetermined location so that the utility receptacle is accessible through the openings in the work surface and grommet member when the receptacle base member is attached to the underside of the work surface.

In a further aspect, the present invention is directed to a utility receptacle apparatus for use with an article of furniture having a work surface and an opening in the work surface. The utility receptacle apparatus comprises a grommet member comprising a top side, a bottom side, a peripheral portion and an opening. The bottom side comprises a structure that is sized to fit into an opening in the work surface. The peripheral portion is sized so as to contact the work surface when the structure is disposed within the opening in the work surface. The utility receptacle apparatus further comprises a receptacle base member comprising a pair of end portions that are configured to be attached to the underside of a work surface of the article of furniture. The receptacle base member comprises at least one utility receptacle that is located on the receptacle base member at a predetermined location so that it is accessible through the openings in the work surface and grommet member when the receptacle base member is attached to the underside of the work surface.

Further features and advantages of the present invention are described in the ensuing description.

DESCRIPTION OF THE DRAWINGS

The present invention will be more readily understandable from a consideration of the accompanying drawings, wherein:

FIG. 2B is an exploded view of the right side of the utility receptacle apparatus of FIG. 1;

FIG. 2C is an exploded view of the left side of the utility receptacle apparatus of FIG. 1;

FIG. 16 is a front view of a receptacle base member in accordance with a further embodiment of the present invention;

FIG. 17 is a top plan view of a grommet member in accordance with another embodiment of the present invention, the lid member of the grommet member being shown in the open position;

FIG. 18 is another top plan view of the grommet member of FIG. 17, the lid member of the grommet member being shown in the closed position, the view showing a brush member that contacts and supports the lid member when the lid member is in the closed position;

FIG. 19 is a front view of the grommet member of FIG. 17;

FIG. 20 is a view of the right side of the grommet member of FIG. 17;

FIG. 21 is a view of the left side of the grommet member of FIG. 17;

BEST MODE FOR CARRYING OUT THE INVENTION

Figure 8:
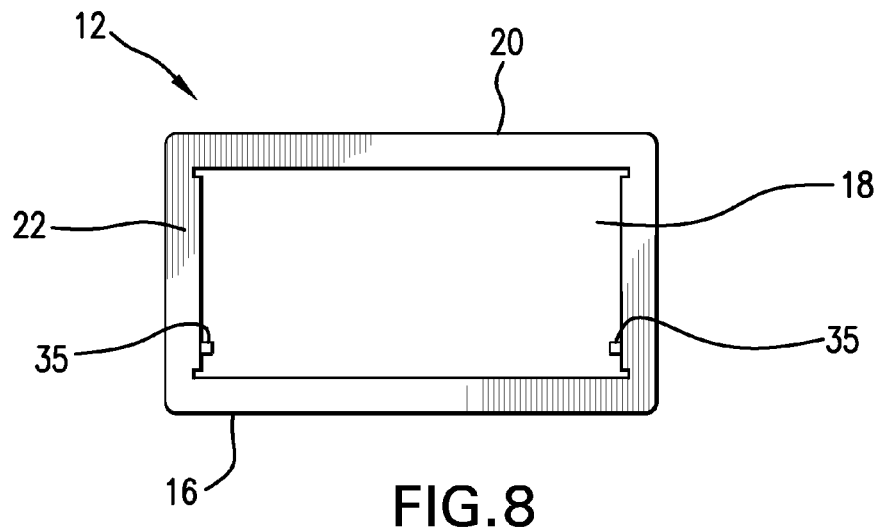
FIG. 8 is a top plan view of the grommet member, the view not showing the lid member so as to facilitate viewing of support members that contact and support the lid member when the lid member with the lid in the closed position.
Figure 9:
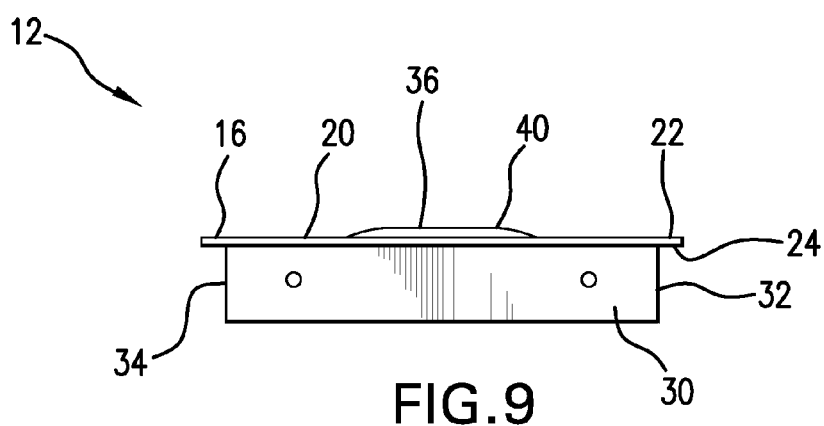
FIG. 9 is a rear view of the grommet member with the lid member in the closed position.
Figure 10:
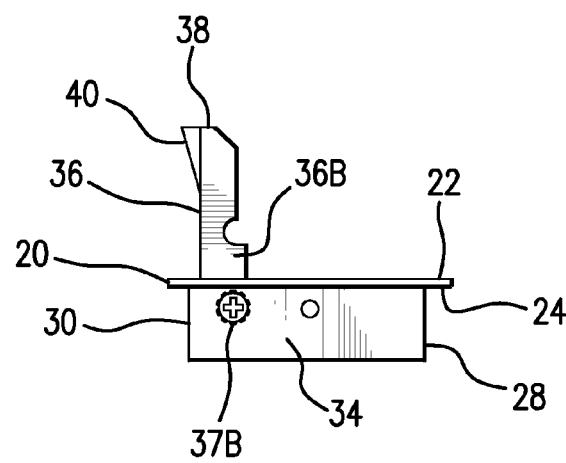
FIG. 10 is a view of the right side of the grommet member with the lid member in the opened position.
Figure 14:
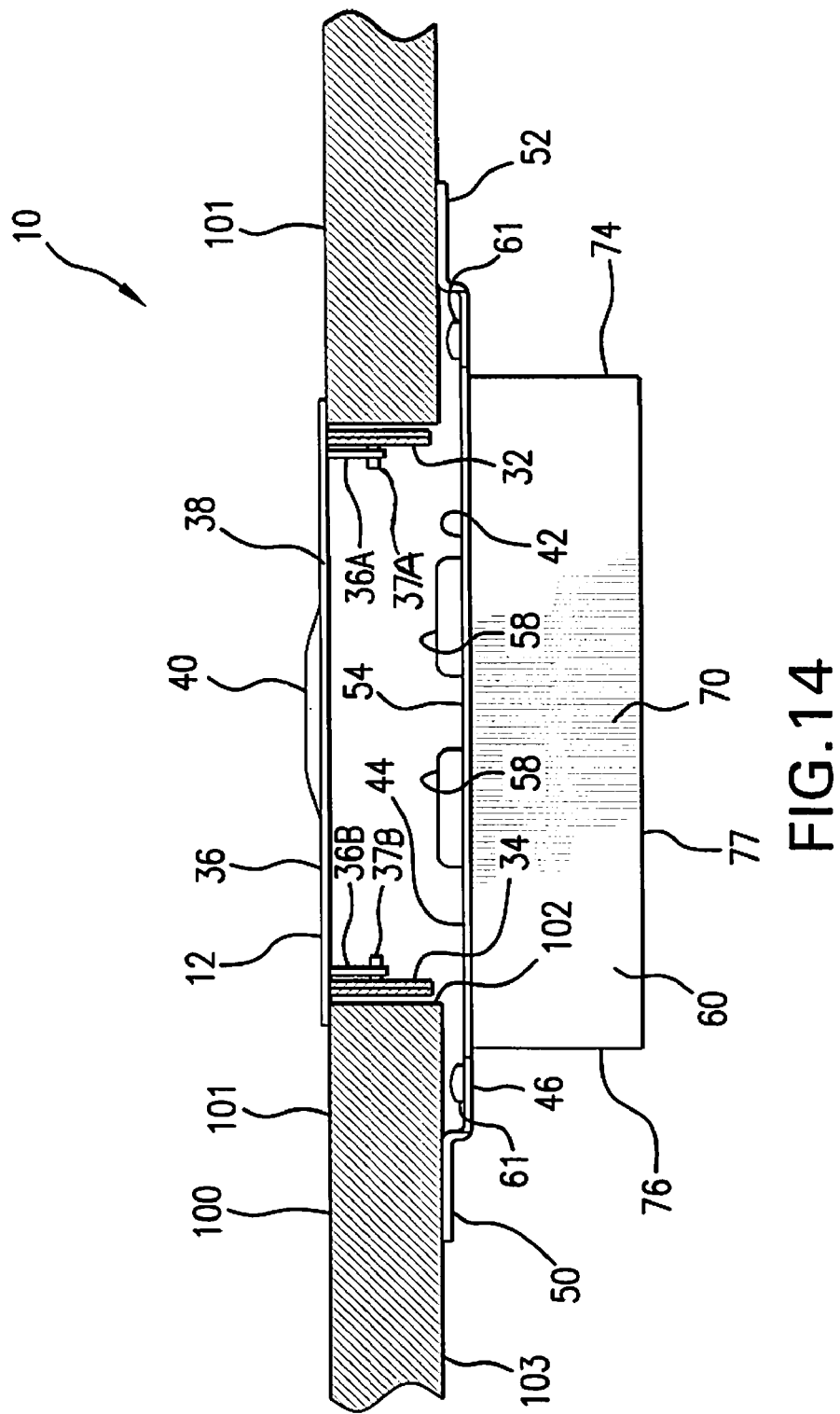
FIG. 14 is a partial, cross-sectional view showing the utility receptacle apparatus of the present invention attached to an article of furniture, the view not showing the front and rear walls of the grommet member in order to facilitate viewing of the interior of the grommet member and a recessed section of the receptacle base member.

Referring to FIGS. 1, 2A, 2B and 2C, there is shown utility receptacle apparatus 10 in accordance with one embodiment of the present invention. Utility receptacle apparatus 10 is configured for use with a work surface. Utility receptacle apparatus 10 comprises grommet member 12 and receptacle base member 14. Referring to FIGS. 3-10, grommet member 12 comprises frame structure 16 that comprises opening 18 therein and upper peripheral portion 20 that extends about opening 18. Upper peripheral portion 20 has top side 22 and bottom side 24. Bottom side 24 contacts work surface 101 of article of furniture 100 as shown in FIG. 14. Frame structure 16 further comprises front wall 28, rear wall 30 and sidewalls 32 and 34 that downwardly extend from and are attached to bottom side 24 of peripheral portion 20. Lid member 36 is located within opening 18 and pivotally attached to the rear portions of sidewalls 32 and 34. In one embodiment, lid member 36 has side portions 36A and 36B that are pivotally attached to sidewalls 32 and 34, respectively, by screws 37A and 37B, respectively. This configuration is shown in FIG. 14. In an alternate embodiment, rivets are used instead of screws to pivotally attach lid member 36 to sidewalls 32 and 34. As shown in FIG. 8, protruding members 35 extend from sidewalls 32 and 34 to contact and support lid member 36 when lid member 36 is in the closed position. In an alternate embodiment, protruding members 35 are not used. Instead, protruding members 35 are replaced by elongated support member 222 which is shown in FIG. 18 and described in the ensuing description. In such an embodiment, elongated support member 222 supports lid member 36 when the lid member 36 is in the closed position. Lid member 36 has front edge 38 which has raised portion 40 to facilitate lifting of lid member 36 by a user. In order to mount grommet member 12 to article of furniture 100, opening 102 is first formed in the work surface 101 of article of furniture 100. Opening 102 extends totally through article of furniture 100 and has a shape that is defined by front wall 28, rear wall 30 and side walls 32 and 34 of frame structure 16, e.g. rectangular, square, etc. The front wall 28, rear wall 30 and sidewalls 32 and 34 of frame structure 16 are then inserted into opening 102 in article of furniture 100. When grommet member 12 is completely mounted to article of furniture 100, bottom side 24 of upper peripheral portion 20 contacts the work surface 101 of article of furniture 100.

Figure 1:
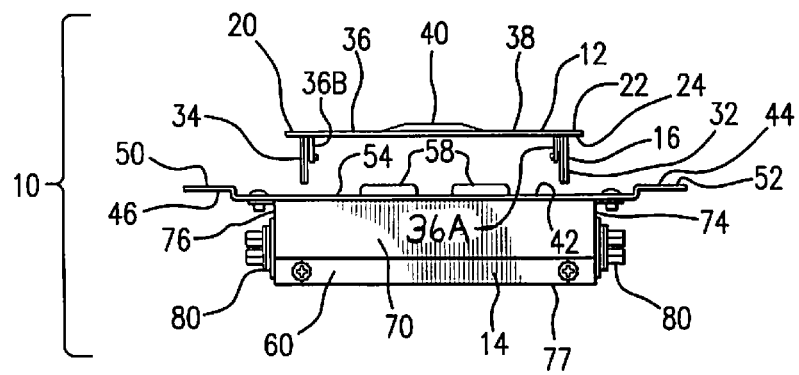
FIG. 1 is an exploded view of a utility receptacle apparatus in accordance with one embodiment of the present invention, the view showing a grommet member and a receptacle base member.
Figure 2A:
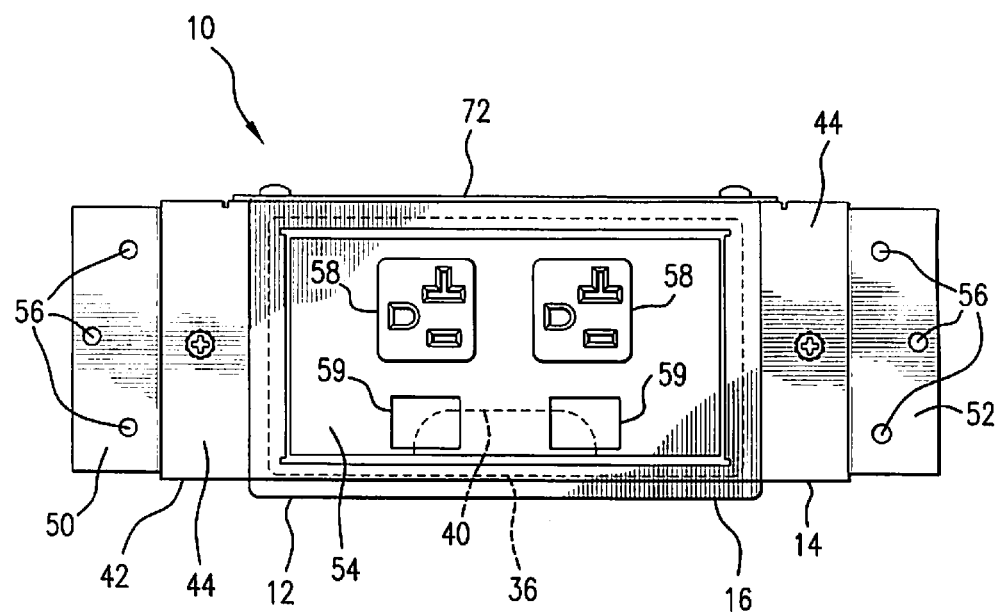
FIG. 2A is top plan view of the utility receptacle apparatus of FIG. 1, the view showing the grommet member in phantom in order to facilitate viewing of utility receptacles of the receptacle base member.
Figure 3:
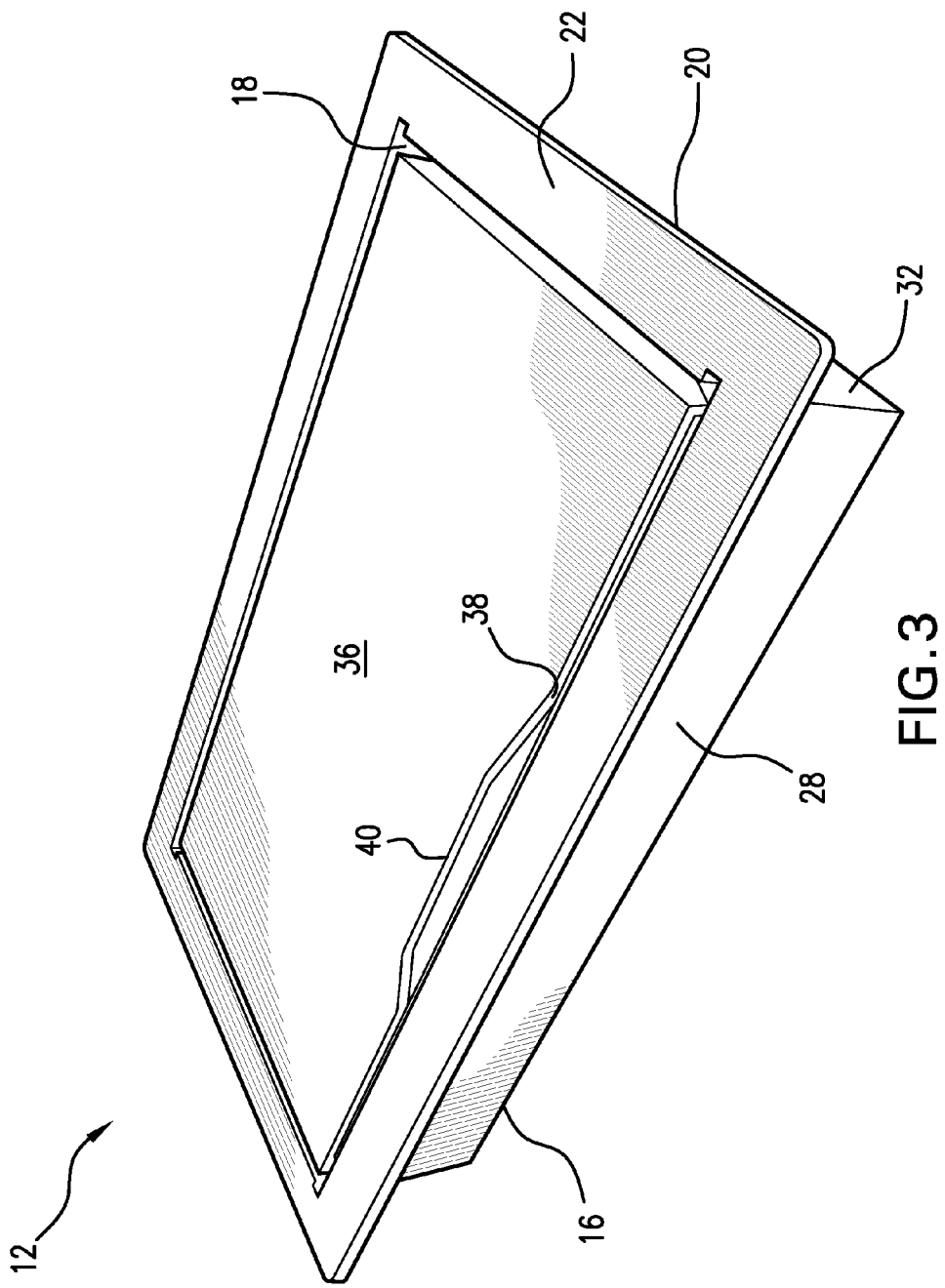
FIG. 3 is a perspective view of the grommet member of the utility receptacle apparatus of FIG. 1.
Figure 4:
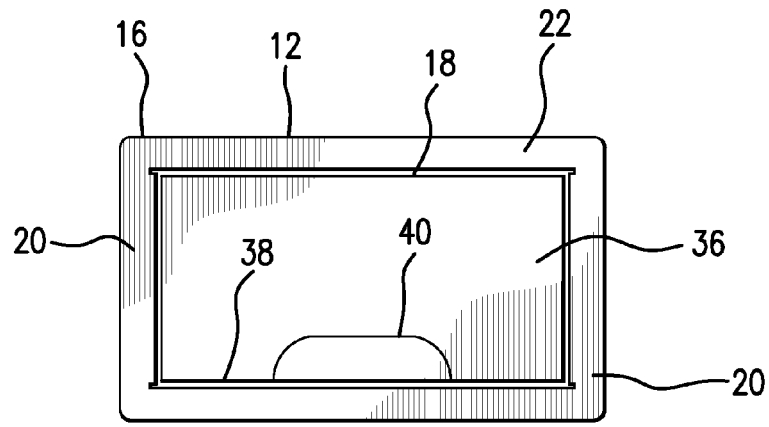
FIG. 4 is a top plan view of the grommet member of FIG. 3, the lid member being shown in the closed position.
Figure 5:
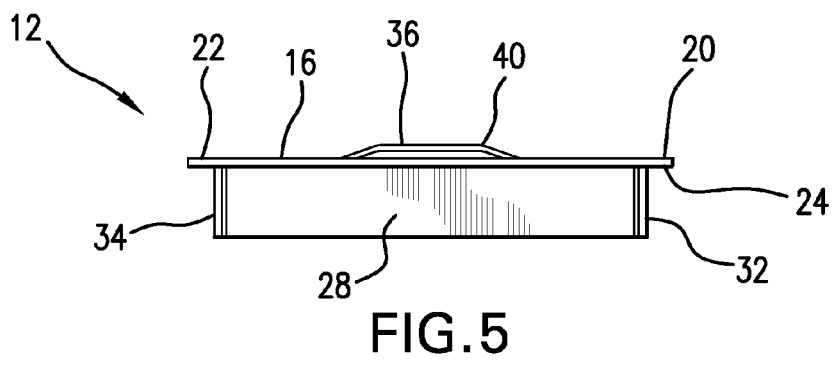
FIG. 5 is a front view of the grommet member of FIG. 3.
Figure 6:
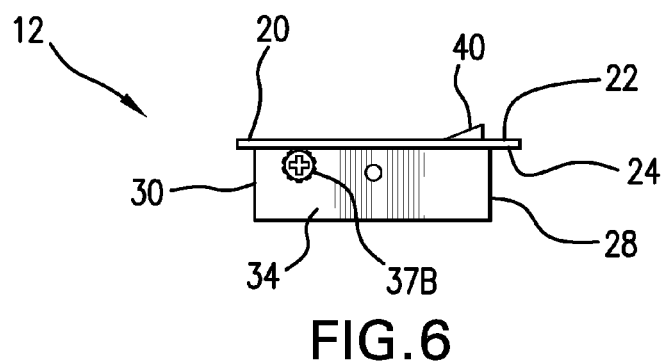
FIG. 6 is a view of the right side of the grommet member of FIG. 3.
Figure 7:
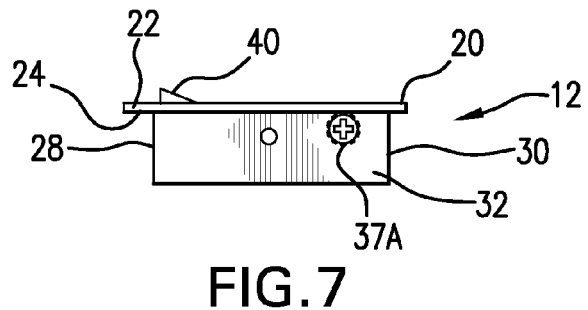
FIG. 7 is a view of the left side of the grommet member of FIG. 3.
Figure 11:
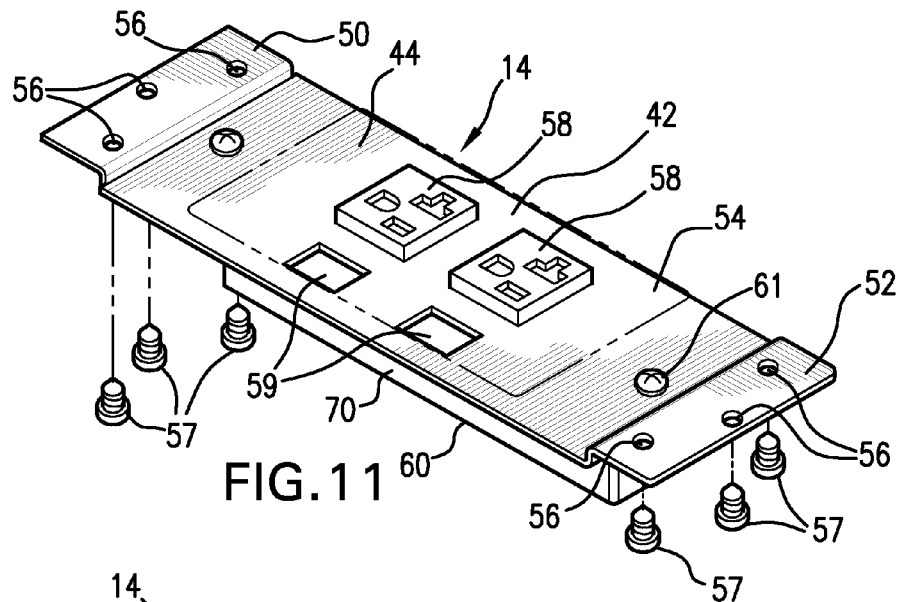
FIG. 11 is a perspective view of the receptacle base member shown in FIG. 1.
Figure 12:
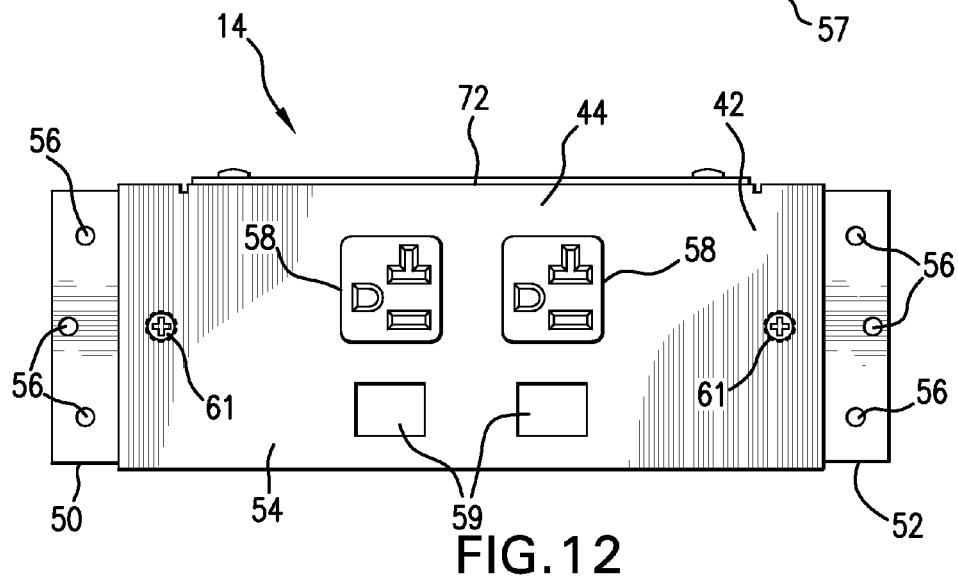
FIG. 12 is top plan view of the receptacle base member of FIG. 1.
Figure 13:
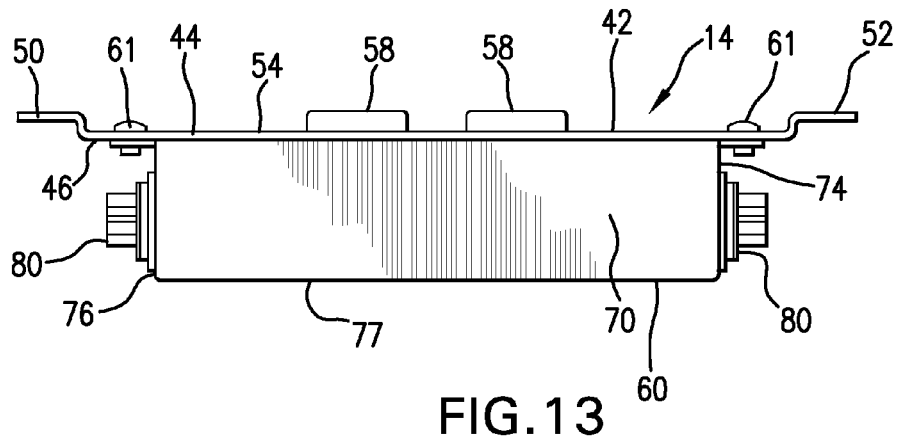
FIG. 13 is a front view of the receptacle base member of FIG. 1.

Referring to FIGS. 1, 2A, 2B, 2C and 13-16, receptacle base member 14 is configured to be attached to article of furniture 100 such that it is below work surface 101 but accessible through opening 102 formed in work surface 101. Receptacle base member 14 comprises top plate section 42 which has top side 44 and bottom side 46. Top plate section 42 comprises a pair of oppositely positioned raised sections 50 and 52, and recessed section 54 that is located between raised sections 50 and 52. Each raised section 50 and 52 has at least one opening 56 therein to receive screws or other suitable fastener devices 57 to allow receptacle base member 14 to be attached to underside 103 of work surface 101. (see FIG. 11). Receptacle base member 14 is mounted to underside 103 in such a manner that recessed section 54 is positioned under opening 102 in work surface 101 of article of furniture 100. Receptacle base member 14 further comprises at least one utility receptacle 58 that is connected to recessed section 54. Utility receptacle 58 is accessible through opening 102 when lid member 36 is in the opened position. Utility receptacle 58 may be configured as a power receptacle that provides electrical power. In one embodiment, there is a plurality of utility receptacles 58 connected to recessed section 54. In the embodiment that is shown in FIG. 2A, utility receptacle 58 is an AC power receptacle and is configured to provide A.C. voltages (e.g. 117 VAC) to power office or laboratory equipment, e.g. personal computers, oscilloscopes, etc. In one embodiment, as shown in FIGS. 2A, 11 and 12, recessed section 54 includes cut-outs 59 that are sized to receive communication receptacles that can provide connection to communication networks such as the internet, broadband, DSL, telephone networks, computer networks, or to receive video and data signals.

In an alternate embodiment, recessed section 54 is configured not to have any cut-outs 59.

Figure 15:
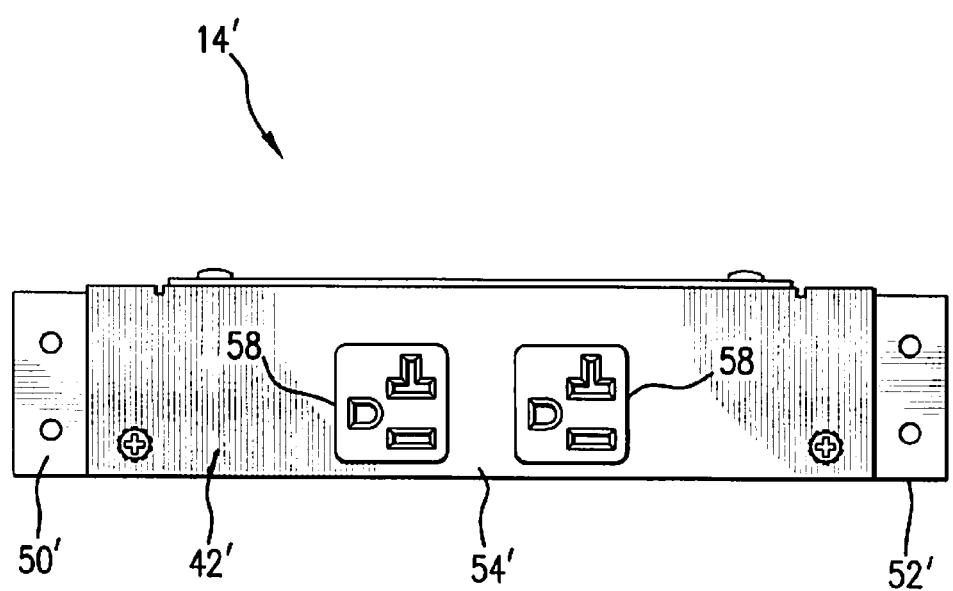
FIG. 15 is top plan view of a receptacle base member in accordance with another embodiment of the present invention.

In an alternate embodiment, utility receptacle apparatus 10 uses only power receptacles and does not use any communication receptacles connected to top plate section 42 (see FIG. 15).

Receptacle base member 14 comprises enclosed member 60 that is attached to bottom side 46 of top plate section 42 with screws 61 or other suitable fastener devices. Enclosed member 60 has front wall 70, rear wall 72, left sidewall 74, right sidewall 76 and bottom panel 77. Enclosed member 60 contains wires and conductors (not shown) that are electrically connected to utility receptacles 58. Referring to FIGS. 1, 2B, 2C and 13, electrical connectors 80 are connected to sidewalls 74 and 76 of enclosed member 60. Like wires of both connectors 80 are connected together. In this embodiment, electrical connectors 80 are configured as Power Pole® conductors manufactured by Anderson Power Products, Inc. of Sterling, Mass. Electrical connectors 80 are connected to a power source (not shown) and deliver power to utility receptacles 58. Having two connectors 80, one of sidewall 74 and one on sidewall 76, allows apparatus 10 to be daisy chained to other apparatuses 10.

In an alternate embodiment, lid member 36 is configured not to have raised portion 40. Instead, lid member 36 has a cut-out that enables a user to insert his or her finger into the cut-out to lift lid member 36. The cut-out also allows wires or cords to pass through the cut-out while the lid member 36 remains closed.

Referring to FIG. 14, utility receptacle apparatus 10 is mounted to an article of furniture 100 such as a work bench, work station, table, desk, etc. Specifically, downwardly extending walls 28, 30, 32 and 34 of grommet member 12 are positioned within opening 102 in work surface 101 and bottom side 24 of peripheral portion 20 contacts the portion of work surface 101 that extends about opening 102. Screws 57 are inserted through corresponding through-holes 56 in raised sections 50 and 52 in order to attach receptacle base member 14 to underside 103 of article of furniture 100. When utility receptacle apparatus 10 is completely mounted to article of furniture 100 and lid member 36 is opened, utility receptacles 58 are accessible through opening 18 in frame structure 16.

In a preferred embodiment, grommet member 12 and receptacle base member 14 are fabricated from metal. However, other suitable materials may be used, e.g. plastic, resins, composites, etc.

Referring to FIG. 15, there is shown a top plan view of receptacle base member 14' is accordance with another embodiment of the invention. Receptacle base member 14' comprises top plate section 42' and has generally the same structure as receptacle base member 14 except that top plate section 42' does not have cut-outs 59. Thus, the width of top plate section 42' is relatively less than the width of top plate section 42 of receptacle base member 14.

Referring to FIG. 16, there is shown receptacle base member 14" in accordance with a further embodiment of the present invention. In this embodiment, receptacle base member 14" does not utilize connectors 80 but instead uses a power cord 150 to deliver power to utility receptacles 58. Power cord 150 is plugged into an AC power source (not shown). As shown in FIG. 16, receptacle base member 14" comprises enclosed member 60" that is attached to bottom side 46 of top plate section 42. Receptacle base member 14" also has front wall 70", a rear wall (not shown), left sidewall 74", right sidewall 76" and bottom panel 77". Enclosed member 60" serves the same function as enclosed member 60 of receptacle base member 14 except that sidewalls 74" and 76" are configured without connectors 80. Power cord 150 extends from sidewall 76" and contains wires that are connected the utility receptacles 58 and provide electrical power to utility receptacle members 58.

Referring to FIGS. 17-21, there is shown grommet member 200 in accordance with another embodiment of the present invention. Grommet member 200 has generally the same structure as grommet member 12 except that grommet member 200 does not use protruding members 35. Grommet member 200 comprises frame structure 202 that comprises opening 204 therein and upper peripheral portion 206 that extends about opening 204. Upper peripheral portion 206 has top side 210 and a bottom side 211 that contacts work surface 101 of article of furniture 100. Similar to frame structure 16 of grommet member 12, frame structure 202 has front wall 212, a rear wall (not shown), and sidewalls 214 and 216. Grommet member 200 includes lid member 218 that is located within opening 204 and pivotally attached to sidewalls 214 and 216 in substantially the same manner as lid member 36 is pivotally attached to sidewalls 32 and 34, of frame 16 of grommet member 12. Lid member 218 has cut-out 219 that is sized to receive a finger of a user to allow the user to lift lid member 218. In accordance with this embodiment of the invention, grommet member 200 further comprises brush member 220 that contacts and support lid member 218 when lid member 218 is in the closed position. Brush member 220 comprises an elongate support member 222 and brush bristles 224 that are attached to elongate support member 222. Elongate support member 222 is attached to the inside of front wall 212. In this embodiment, when lid member 218 is closed, lid member 218 contacts and is supported by elongate support member 222. When lid member 218 is closed, brush bristles 224 are located within cut-out 219. Since brush bristles 224 are soft and movable, wires or power cords can pass through brush bristles 224 while lid member 218 is closed.

In accordance with another embodiment of the present invention, the utility receptacle apparatus comprises a device charging system that is configured to charge electronic devices such as cell phones, I-phones, I-pods, etc. In such an embodiment, the device charging system is attached to the top side of the grommet member. Such an embodiment is shown in FIGS. 22-27. Utility receptacle apparatus 300 generally comprises grommet member 302, receptacle base member 304 and device charging system 306. In one embodiment, device charging system 306 is configured as the charging device described in U.S. Pat. No. 7,172,196, entitled "Systems And Methods For Providing Electric Power To Mobile And Arbitrarily Positioned Devices", issued Feb. 6, 2007, the disclosure of which patent is hereby incorporated by reference.

Figure 22:
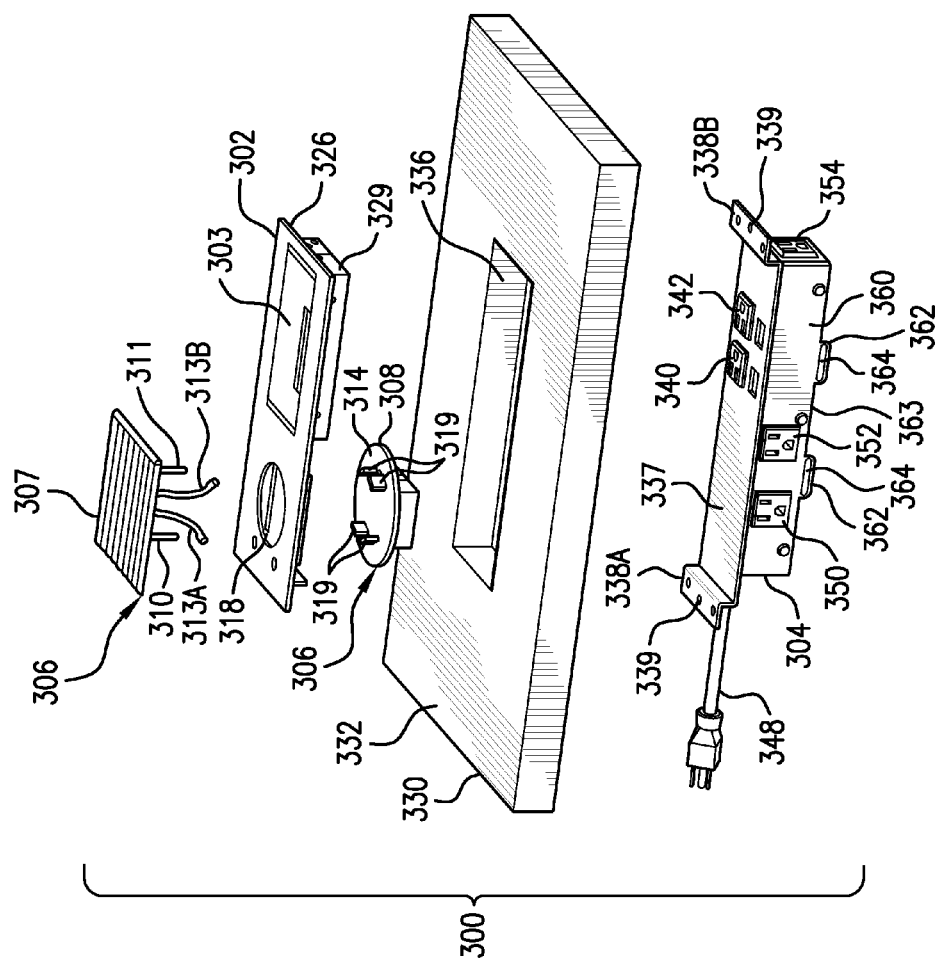
FIG. 22 is an exploded view of a utility receptacle apparatus in accordance with a further embodiment of the present invention.
Figure 24:
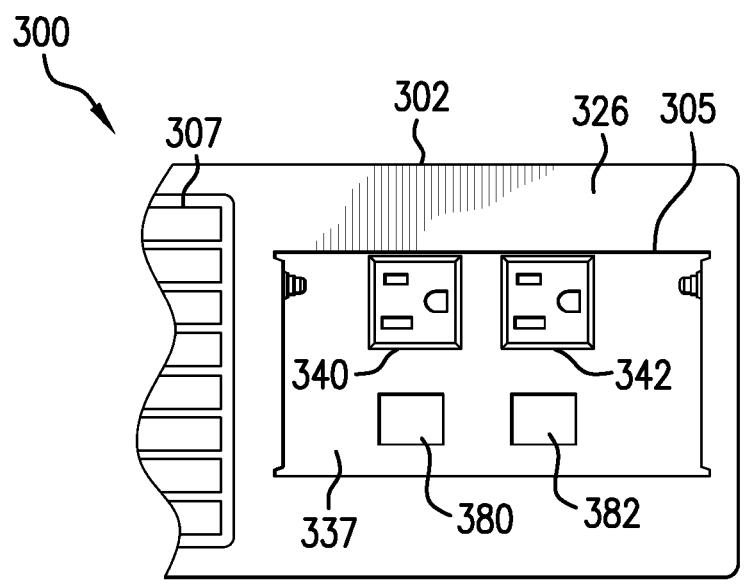
FIG. 24 is an enlarged view of a portion of the view of FIG. 23, the view not showing the lid member of the grommet member in order to facilitate viewing of power receptacles.
Figure 25A:
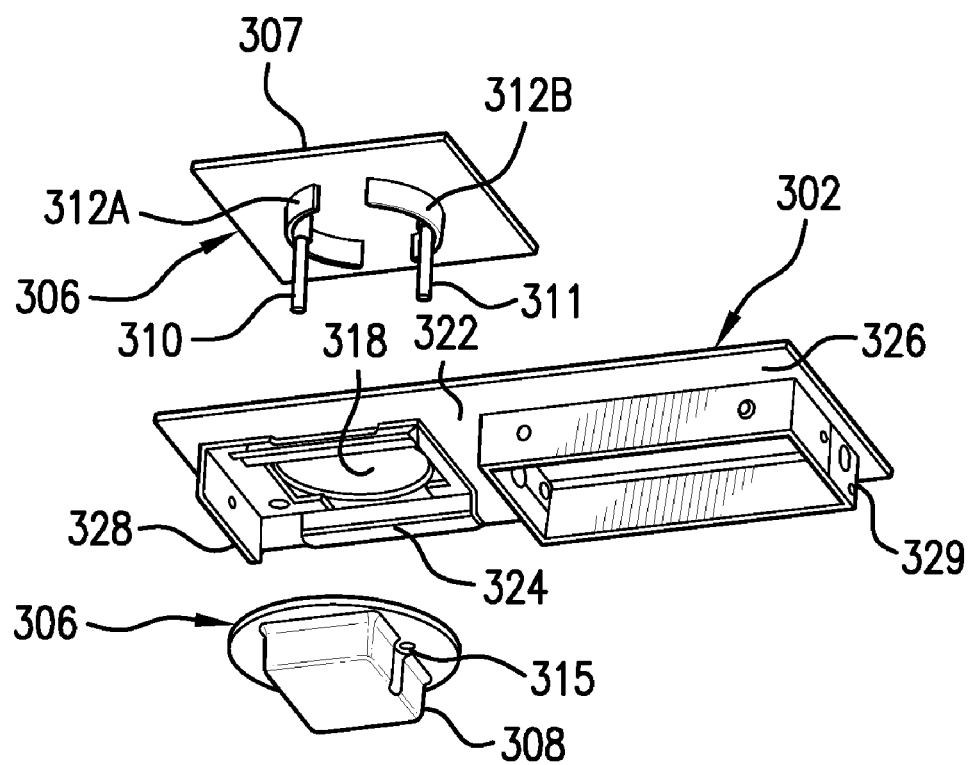
FIG. 25A is an exploded view illustrating the interconnection of a device charging system and the grommet member, both of which being shown in FIG. 22.
Figure 25B:
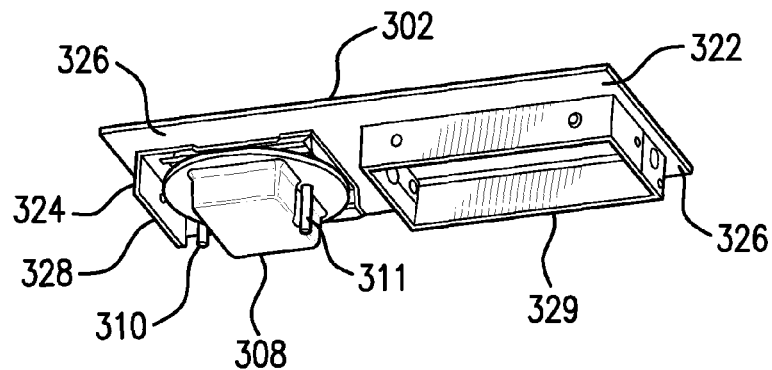
FIG. 25B is a perspective view showing the device charging system and the grommet member, both of which being shown in FIG. 25A, completely connected together.

As shown in FIG. 24, grommet member 302 has opening 305 (see FIG. 24) the purpose of which is discussed in the foregoing description. Referring to FIGS. 22, 25A and 25B, device charging system 306 comprises charging pad 307 and clamp device 308. Pad 307 has downwardly extending pins 310 and 311. Clamp device 308 has sockets for receiving pins 310 and 311. One of these sockets is referred to by reference number 315. (see FIG. 25A). The other socket is on the opposite side of clamp device 308 but is not shown. The purpose of pins 310 and 311 is to allow pad 307 to be removably secured to clamp device 308 and to provide stability so that pad 307 does not move. Curved support members 312A and 312B are connected to the bottom of pad 307 (see FIG. 25A). Pins 310 and 311 are attached to curved support members 312A and 312B, respectively. Curved support members 312A and 312B are positioned so that they fit through opening 318 in grommet member 302. Pad 307 includes wires or electrical conductors 313A and 313B that are connected to corresponding electrical contacts (not shown) in clamp device 308. Clamp device 308 delivers electrical power to pad 307 via wires or conductors 313A and 313B. As shown in FIG. 22, clamp device 308 comprises top surface 314 and upwardly extending alignment members 319. Upwardly extending alignment members 319 facilitate alignment of clamp device 308 within opening 318 in grommet member 302. A step down transformer (not shown) converts A.C. power (e.g. 115 VAC) to a predetermined, relatively lower voltage and provides this predetermined, lower voltage to pad 307 via wires or conductors 313A and 313B.

Figure 26:
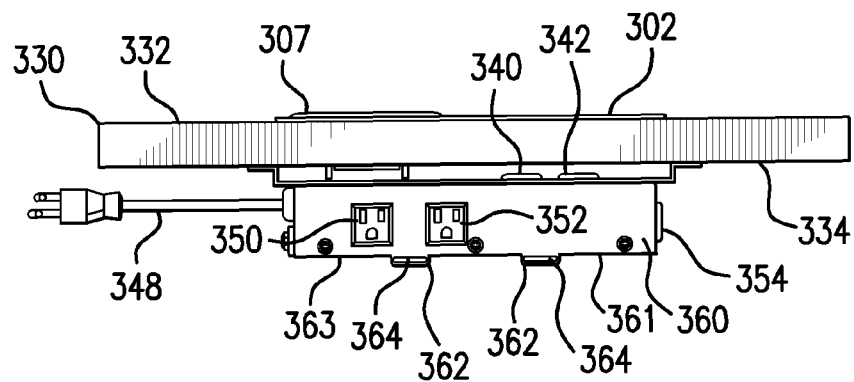
FIG. 26 is a front view of the utility receptacle apparatus of FIG. 22.

Referring to FIG. 22, grommet 302 is relatively larger in size than grommet member 12 (see FIG. 4) and has opening 318. Opening 318 is sized so that pins 310 and 311 can pass through and be inserted into the sockets of clamp device 308. As shown in FIGS. 25A and 25B, when pins 310 and 311 are fully inserted into the sockets of clamp device 308, alignment members 319 are within opening 318 in grommet member 302. Grommet member 302 has a bottom side 322 and alignment structure 324 that is attached to bottom side 322. Clamp device 308 fits into alignment structure 324 when pad 307 is removably secured to clamping device 308. In a preferred embodiment, clamp device 308 is removably attached to alignment structure 324. In one embodiment, alignment structure 324 has a resilient member that holds clamp device 308 in place. Grommet member 302 further comprises peripheral portion 326 which extends about the entire perimeter of grommet member 302. Alignment structure 324 further includes downwardly extending wall member 328 and rectangular shaped structure 329. As shown in FIGS. 22 and 26, article of furniture 330 has top side 332, bottom side 334 and opening 336. Opening 336 extends through article of furniture 330. Wall member 328 and rectangular shaped structure 329 are configured to have a predetermined size and geometry that fit snugly within opening 336 of article of furniture 330 (see FIGS. 22 and 26). Wall member 328 and rectangular shaped structure 329 prevent grommet member 302 from shifting or moving with respect to work surface 332 of article of furniture 330.

As described in the foregoing description, when grommet member 302 is mounted to the work surface 332, downwardly extending wall member 328 and the rectangular shaped structure 329 confront the inner edges or sides of opening 336 so as to prevent movement of grommet member 302 with respect to work surface 332. When grommet member 302 is mounted to work surface 332 such that wall member 328 and rectangular shaped structure 329 are positioned within opening 336 of article of furniture 330, the peripheral portion 326 of grommet member 302 contacts work surface 332.

Figure 27:
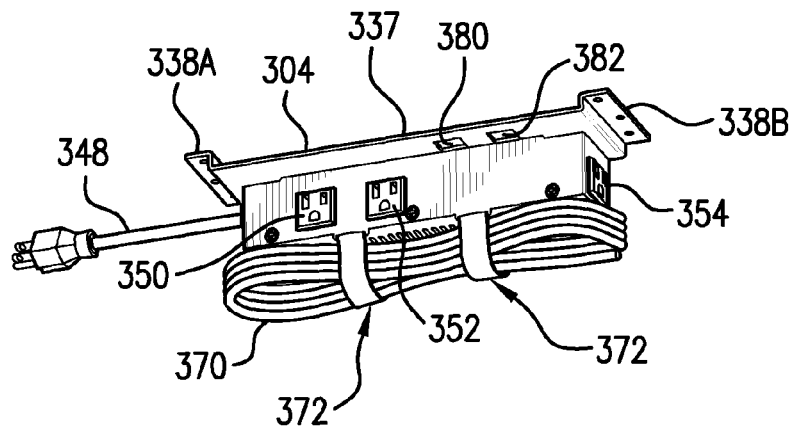
FIG. 27 is a perspective view of the utility receptacle apparatus of FIG. 22 having an electrical power cord secured thereto.

Referring to FIGS. 22 and 27, receptacle base member 304 provides generally the same function as receptacle base member 14 shown in FIG. 11. Receptacle base member 304 comprises top plate member 337 which has end portions 338A and 338B. Each end portion 338A and 338B has openings 339 for receiving fastening devices (e.g. screws) that are used to attach receptacle base member 304 to bottom side 334 of article of furniture 330. Receptacle base member 304 further comprises power receptacles 340 and 342 that are connected to top plate member 337. Power receptacles 340 and 342 only accessible when a user lifts lid 303 of grommet member 302. (see FIG. 23). Receptacle base member 304 includes additional power receptacles 350, 352 and 354. As shown in FIGS. 22, 26 and 27, power receptacles 350, 352 and 354 are accessible only under article of furniture 330. Power cord 348 is configured to be plugged into an A.C. voltage receptacle and provides A.C. power to power receptacles 340, 342, 350, 352 and 354 via wiring that is internal to receptacle base member 304. Receptacle base member 304 is attached to bottom side 334 of article of furniture 330 such that power receptacles 340 and 342 are positioned under opening 336 in article of furniture 330 and accessible through the opening 305 in grommet member 302 when lid 303 is opened.

Referring to FIGS. 22, 26 and 27, receptacle base member 304 includes a front side 360, a rear side (not shown), bottom side 361 and a plurality of tabs 362 that extend down from the bottom edge 363 of front side 360. Similarly, additional tabs (not shown) extend down from the bottom edge (not shown) of the rear side of receptacle base member 304. Each tab 362 has a slot 364 formed therein. Slot 364 is sized to receive a cable tie or Velcro strap 372. As shown in FIG. 27, the user wraps electrical cables or cords 370 into a coil and secures the coil to the bottom side 361 of receptacle base member 304 with Velcro straps 372.

Referring to FIG. 24, in a preferred embodiment, openings 380 and 382 are formed in top plate member 337 so as to allow communication or data receptacles to be connected to top plate member 337.

Figure 23:
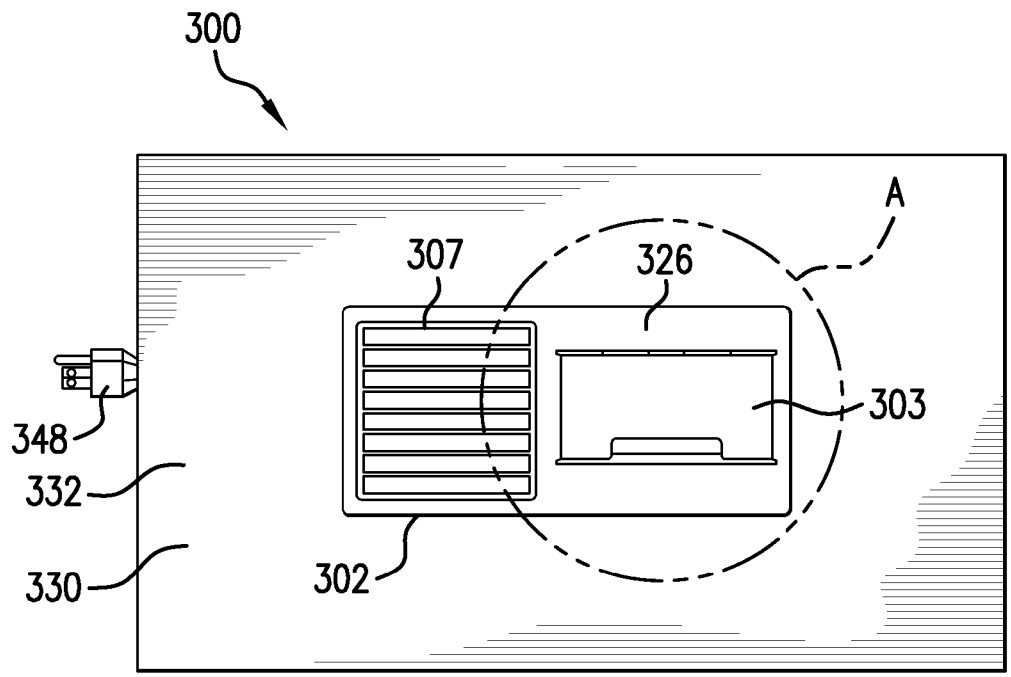
FIG. 23 is a top view of a grommet member shown in FIG. 22.

Referring to FIGS. 23, 24 and 26, a user lifts lid 303 of grommet member 302 in order to have access to receptacles 340 and 342. While the user is using any or all of receptacles 340, 342, 350, 353 and 354, the user may position a peripheral device upon charging pad 307 in order to be recharged. Such peripheral devices include cell phone, I-pod, Blackberry, Bluetooth, and other devices that use a rechargeable battery. Other peripheral devices are described in the aforementioned U.S. Pat. No. 7,172,196. It is to be understood that utility receptacle apparatus 300 can be configured to work with device charging systems other than the type of device charging system that is shown in the aforementioned U.S. Pat. No. 7,172,196. For example, in another embodiment, the pad (i.e. pad 307) is rigidly attached to grommet member 302 and clamping device 308 is not used. It is also to be understood that pad 307 can be configured to have a surface that is different than what is shown in FIG. 22.

It is also to be understood that the invention is not limited to the illustrations described and shown herein, which are deemed to be merely illustrative of the best modes of carrying out the invention, and which are susceptible of modification of form, size, arrangement or position of parts, and details of operation. Rather, the invention is intended to encompass all such modifications which are within the spirit and scope as defined by the claims.

What is claimed is:

1. A utility receptacle apparatus for use with an article of furniture having a work surface and an opening in the work surface, comprising:
   a grommet member comprising a top side, a bottom side, a peripheral portion and an opening, the bottom side comprising structure that is sized to fit into an opening in the work surface, the peripheral portion being sized so as to contact the work surface when the structure is disposed within the opening in the work surface;
   a device charging system attached to the grommet member and comprising a charging pad for receiving and charging a chargeable electronic device, the device charging system further comprising electrical conductors for connection to an electrical power source; and
   a receptacle base member configured to be attached to the underside of a work surface of the article of furniture, the receptacle base member comprising at least one utility receptacle that is located on the receptacle base member at a predetermined location so that it is accessible through the openings in the work surface and grommet member when the receptacle base member is attached to the underside of the work surface.

2. The utility receptacle apparatus according to claim 1 further comprising a power cord secured to the receptacle base member, the power cord containing wires that are electrically connected to the at least one utility receptacle, the power cord being adapted to be connected to an electrical power source.

3. The utility receptacle apparatus according to claim 2 wherein the receptacle base member further comprises an enclosed portion to which the power cord is secured.

4. The utility receptacle apparatus according to claim 3 further comprising at least one additional utility receptacle attached to the enclosed portion, wherein the wires of the power cord are electrically connected to the at least one additional utility receptacle.

5. The utility receptacle apparatus according to claim 1 further comprising a lid member that is pivotally attached to the grommet member to provide access to and close off the opening in the grommet member.

6. The utility receptacle apparatus according to claim 1 further comprising at least one communication receptacle connected to the receptacle base member.

7. A utility receptacle apparatus for use with an article of furniture having a work surface and an opening in the work surface, comprising:
   a grommet member comprising a top side, a bottom side, a peripheral portion and an opening, the bottom side comprising structure that is sized to fit into an opening in the work surface, the peripheral portion being sized so as to contact the work surface when the structure is disposed within the opening in the work surface; and
   a receptacle base member having portions thereof that are configured to be attached to the underside of a work surface of the article of furniture, the receptacle base member comprising at least one utility receptacle that is located on the receptacle base member at a predetermined location so that it is accessible through the openings in the work surface and grommet member when the receptacle base member is attached to the underside of the work surface.

8. The utility receptacle apparatus according to claim 7 further comprising a device charging system attached to the grommet member and comprising a charging pad for receiving and charging a chargeable electronic device, the device charging system further comprising electrical conductors for connection to an electrical power source.

9. The utility receptacle apparatus according to claim 7 further comprising a power cord secured to the receptacle base member, the power cord containing wires that are electrically connected to the at least one utility receptacle, the power cord being adapted for connection to an electrical power source.

10. The utility receptacle apparatus according to claim 9 wherein the receptacle base member further comprises an enclosed portion to which the power cord is secured.

11. The utility receptacle apparatus according to claim 10 further comprising at least one additional utility receptacle attached to the enclosed portion, wherein the wires of the power cord are electrically connected to the at least one additional utility receptacle.

12. The utility receptacle apparatus according to claim 7 further comprising a lid member that is pivotally attached to the grommet member to provide access to and close off the opening in the grommet member.

13. The utility receptacle apparatus according to claim 7 further comprising at least one communication receptacle connected to the receptacle base member.

* * * * *